Figure 1:
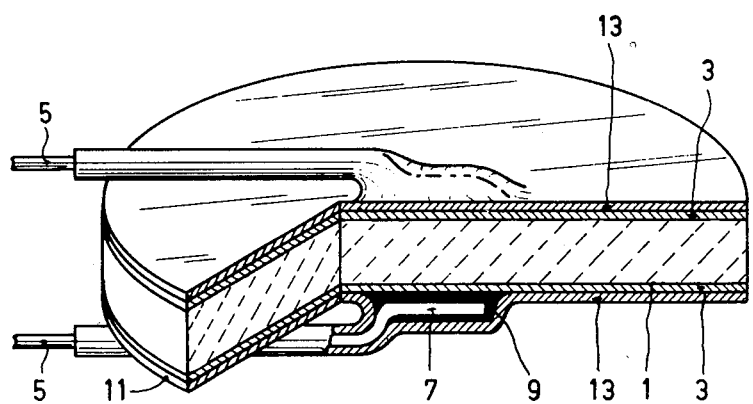

United States Patent [19]

Vorst

[11] 3,989,987
[45] Nov. 2, 1976

[54] ELECTRICAL CAPACITOR HAVING SUPPLY MEMBERS CONNECTED TO THE COATINGS

[75] Inventor: Henricus Hubertus Marie Vorst, Eindhoven, Netherlands

[73] Assignee: U.S. Philips Corporation, New York, N.Y.

[22] Filed: July 23, 1975

[21] Appl. No.: 598,175

[30] Foreign Application Priority Data
Aug. 20, 1974 Netherlands........................ 7411079

[52] U.S. Cl................................ 317/258; 317/242; 317/261
[51] Int. Cl.²........................................ H01G 1/005
[58] Field of Search............ 317/242, 258, 260, 261

[56] References Cited
UNITED STATES PATENTS

| | | | |
|---|---|---|---|
| 2,606,955 | 8/1952 | Herrick............................ | 317/242 X |
| 3,364,401 | 1/1968 | Rayburn............................. | 30/260 |

FOREIGN PATENTS OR APPLICATIONS

| | | | |
|---|---|---|---|
| 658,452 | 10/1951 | United Kingdom................ | 317/261 |

*Primary Examiner*—E. A. Goldberg
*Attorney, Agent, or Firm*—Frank R. Trifari; Daniel R. McGlynn

[57] ABSTRACT

A capacitor which has been given a predetermined capacitance by sand-blasting, in which an additional metal layer of higher conductivity is galvanically deposited over the electrodes, over the junctions of the supply wire and the electrode, and over a portion of the supply wire.

8 Claims, 1 Drawing Figure

ELECTRICAL CAPACITOR HAVING SUPPLY MEMBERS CONNECTED TO THE COATINGS

The invention relates to an electrical capacitor, comprising a dielectric which is provided with metal coatings, at least one supply member being soldered to each coating.

A capacitor of the kind set forth is known from U.S. Pat. No. 2,606,955. The energy loss of a capacitor can be inter alia expressed as the loss factor tan $\delta$. The energy loss of a capacitor is determined by the dielectric present in the capacitor as well as by the coatings and the current supply members and by their electrical connection. The supply members are usually connected to the coatings by way of a lead-tin solder. Because lead-tin solder has a lower specific conductivity than the supply members and the coatings, a comparatively large quantity of energy will be dissipated at the area of the connection. The dissipation increases at higher frequencies where the skin effect starts to play a role, because normally the solder covers parts of the supply members and the coatings. This increase is noticeable particularly at frequencies beyond 1 MHz.

The invention has for its object to minimize such losses. To this end, the invention is characterized in that at the area of a soldered connection between a supply member and a coating, the member and the solder are covered by an additional layer of metal having a smaller specific resistance than the solder, the said layer being deposited after the connection has been made, the said metal extending over at least the coating in the immediate vicinity of the soldering location.

The advantages of the present invention are:
1. A lower tan $\delta$ is obtained due to:
   a. the restoration of the vague electrode edge (German Pat. No. B 13952)
   b. a better transition between supply wire and electrode for high frequencies
   c. a lower resistance of the electrode surface, per unit of surface area.
2. As a consequence of the possibility of restoration of the electrode edge, the correction of ceramic capacitors by sand-blasting is possible at a higher speed, the same quality still being maintained.

The invention will be described in detail hereinafter with reference to the drawing.

FIG. 1 is a diagrammatic, perspective, partly broken-away view of a preferred embodiment of a capacitor according to the invention.

The capacitor shown in FIG. 1 comprises a dielectric 1 of ceramic or glass-like material, on both sides of which electrically conductive coatings 3, for example, of vapor deposited material such as copper, are provided. The supply members 5, for example, made of copper, are soldered to the coatings 3 by means of a lead-tin solder. To this end, the end 7 of the supply members 5 is provided in advance with a layer of solder which fuses with a second local layer of solder on the coatings 3 during the soldering of the supply members 5 to the coatings 3. According to the invention, on each side of the dielectric 1 the coating 3, the soldered connection 9 and an adjoining portion of the supply member 5, not covered by solder, are covered by an additional copper layer 13. The copper layer 13 is deposited preferably in a salt bath.

As a consequence of the skin effect, the losses at higher frequencies are mainly determined by the conduction in the surface layer of the conductive portions 3, 5 and 9, the losses will be substantially reduced due to the copper layer 13 provided thereon, it alternatively being possible for the said layer to be made of an other material having a higher conductivity than lead-tin solder. By making the additional metal layer 13 extend over the entire coating 3, including the edge 11 thereof, on the one hand an advantage is obtained in that ohmic losses in the coating 3 are reduced, also at low frequencies, whilst on the other hand additional losses on the edge 11 of the coating 3, where this edge has locally been blunted by the mechanical method of adjusting the capacitance, for example, by sand-blasting, are also reduced.

It is to be noted that this edge improvement is known from German Pat. application No. B 13,952.

What is claimed is:
1. An electrical capacitor, comprising a dielectric provided with metal coatings, at least one supply member soldered to each of said coatings, the area of said one soldered connection between one of said supply members and a corresponding coating being covered by an additional layer of metal having a smaller specific resistance than the solder, said layer being deposited after the connection has been made, with said metal layer extending over at least the coating in the immediate vicinity of the soldering area.
2. The capacitor as defined in claim 1 wherein said additional metal layer extends as far as an edge of the coating where this coating has been locally removed in advance by a mechanical operation.
3. The capacitor as defined in claim 1 wherein said additional metal layer is deposited in a salt bath.
4. The capacitor as defined in claim 1 wherein said additional metal layer consists of aluminum.
5. The capacitor as defined in claim 1 wherein said additional metal layer consists of copper.
6. The capacitor as defined in claim 1 wherein said additional metal layer consists of silver.
7. The capacitor as defined in claim 1 wherein said additional metal layer consists of gold.
8. The capacitor as defined in claim 1 wherein said additional metal layer consists of platinum.

* * * * *